United States Patent Office 3,347,258
Patented Oct. 17, 1967

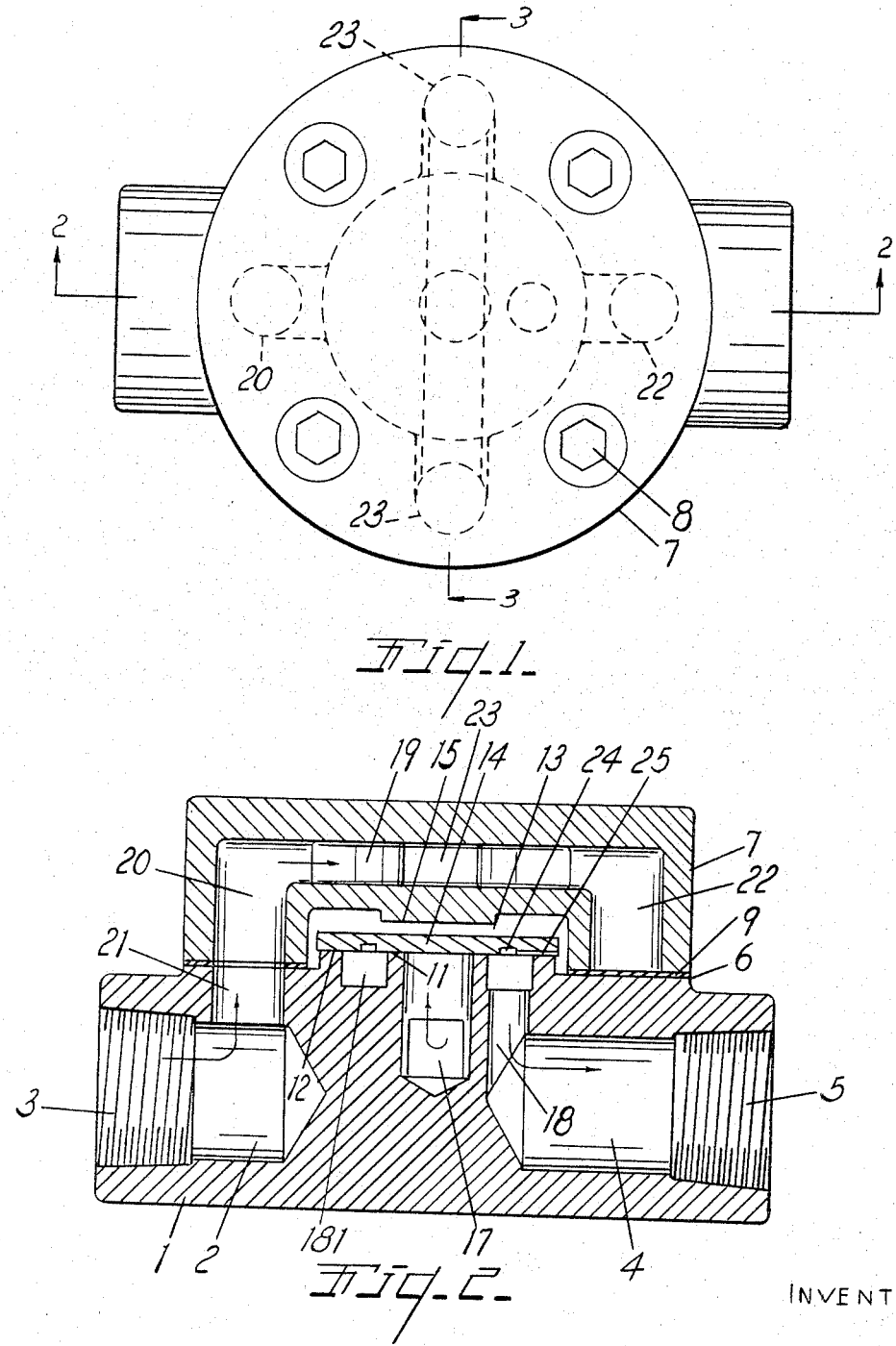

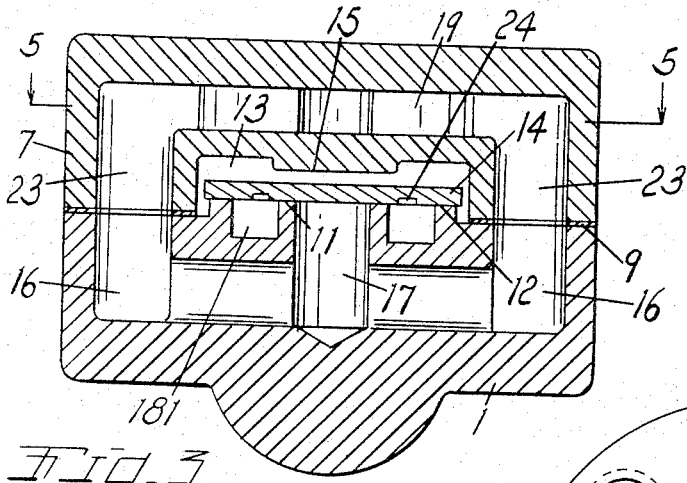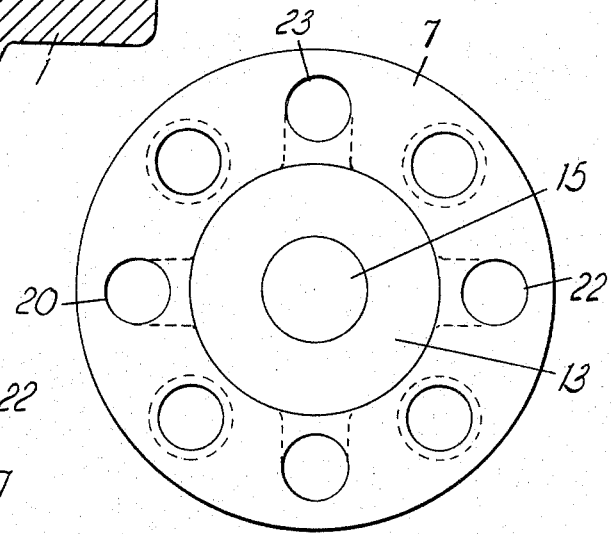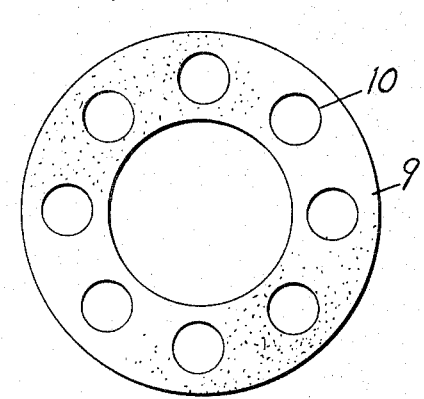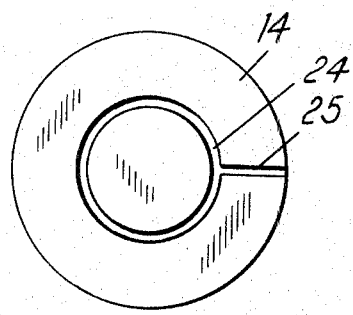

3,347,258
STEAM TRAP
Nils A. Judsen and Robert T. Kirchner, Three Rivers, Mich., assignors to Armstrong Machine Works, Three Rivers, Mich.
Filed Feb. 4, 1965, Ser. No. 430,341
3 Claims. (Cl. 137—183)

ABSTRACT OF THE DISCLOSURE

A steam trap consisting of first and second body members detachably connected together, said trap having inlet and outlet ports connected to inlet and outlet conduits respectively. The first body member has radially spaced inner and outer annular valve seats thereon which are disposed within a valve chamber formed within the second body member. The second body member has means defining a heating chamber therein surrounding the valve chamber, the valve chamber having a disk-like valve disposed therein for floating movement in coacting relationship to the valve seats. Passageways in the trap interconnect the inlet port to the heating chamber which in turn is interconnected to the valve chamber, said valve opening and closing a passage interconnecting said valve chamber to the outlet. The steam within the heating chamber is in surrounding relationship to the valve chamber and retards the condensation of the steam therein so as to reduce the frequency of valve operation. A small radial groove is formed on the face of the valve disk to permit escape of the steam from the valve chamber so as to regulate the frequency of the valve opening.

---

This invention relates to steam traps. The main objects of this invention are:

First, to provide a steam trap which operates efficiently in a wide variety of surrounding temperature conditions.

Second, to provide a trap that is operative over a wider range of pressure differentials on its opposite sides.

Third, to provide a trap that will release condensate and entrapped air with a minimum of loss of steam.

Objects relating to details and economies of the invention will appear from the description to follow. The invention is defined and pointed out in the claims.

A preferred embodiment of the invention is illustrated in the accompanying drawing, in which:

FIG. 1 is a top view of a steam trap embodying our invention with some of the passages and other structural features being indicated by dotted lines.

FIG. 2 is a vertical section on a line corresponding to line 2—2 of FIG. 1.

FIG. 3 is a vertical section on a line corresponding to line 3—3 of FIG. 1.

FIG. 4 is an inverted view of the top body member.

FIG. 5 is a cross sectional view on a line corresponding to line 5—5 of FIG. 3 of the upper body member.

FIG. 6 is an inverted plan view of the disc-like valve.

FIG. 7 is a plan view of the gasket.

In the embodiment of our invention illustrated, the first or lower body member 1 has an inlet 2 preferably internally threaded as indicated at 3 to receive an inlet conduit and it has an outlet 4 preferably disposed in alignment with the inlet, as is illustrated and having an internally threaded portion 5 adapted to receive a discharge conduit. It should be understood that steam traps embodying this invention are adapted to be used and are used in widely varying types of circulating systems.

The body member 1 has an annular seat 6 for the second body member 7, this seat being of such width as to permit passage being formed therein. The two body members are secured together by the bolts or screws 8 which clampingly secure the body members together with the gasket 9 between them. The threaded engagement of the screws 8 with the lower body member are not illustrated, as it will be understood that the gasket 9 has holes 10 therein through which the coupling bolts or screws 8 are disposed.

The body member 1 is provided with inner and outer valve seat members 11 and 12 which desirably, and in the embodiment illustrated, project above the seat 6 for the second body member.

The second body member 7 has a valve chamber 13 into which the valve seat members project and which is dimensioned both in height and width to receive the disk-like valve 14 which seats upon the inner and outer valve seat members, as is illustrated in the drawings. The valve is not shown in open position, but it will be noted that it can floatingly move upwardly against the central stop portion 15 in the top of the valve chamber 13. This stop member is of substantial width so that the valve, when in fully open position, does not tilt.

The first body member 1 has angular passages 16 therein, see FIG. 3, which open to the valve controlled passage 17 which discharges into the valve chamber through the inner valve seat members forming a part of this discharge passage. The outlet passage 18 opens between the valve seat members, as is illustrated in FIG. 2, and into the discharge passage 4. The second body member has a heat chamber 19 above the top of the valve chamber and this is connected to the inlet by the passage 20, which is connected by the passage 21 to the inlet 2. It should be understood that the second passage-like portion 22 does not constitute a passage when in use, but as a matter of structural installing convenience it corresponds to the passage 20 and also serves as a temperature balancing feature.

In the embodiment illustrated there are two passages 23 connecting the heat chamber 19 through the passage 17. With this arrangement there is a flow of condensate which automatically opens the valve. The valve is provided with an annular groove 24 in its underside which opens to the passage between the valve seat members and it is provided with a radial groove-like passage 25 which opens to this annular groove 24 and extends to the outer edge of the valve, thereby providing a very restricted opening for the discharge conduit to the valve chamber portion above the valve. The valve is opened by the condensate, but when steam reaches the valve the valve lifting stress decreases and the flow around the disk into the condensing chamber results in the valve closing. The valve remains closed until the pressure in the condensing chamber is reduced to the point where pressure at the inlet forces the valve open, and this cycle in use repeats itself periodically. The chamber above the valve chamber which constitutes a heating chamber affects the cycling rate of the valve. The heating chamber also affects the operation of the valve under varying temperatures surrounding the valve.

Operation

Starting with a cold trap and supply connection at 2 and 20 and the application of pressure from steam entering the steam line (not shown) to which the valve is connected, condensate and noncondensible gasses such as air flow to the trap, passing through chamber 19 and passages 23 and 17 to the bottom of the disk-like valve 14 within the outline of the inner valve seat 11. The pressure in the outlet 4, which is less than the incoming pressure and which is communicated to the valve chamber 13 through slot 25, permits the incoming pressure and liquid condensate to float or lift the valve 14. Condensate accordingly flows over seat 11 to the annular chamber 181 to outlet passages 18 and 4. Some of the condensate may also flow around the periphery of valve 14 into chamber 13.

As the temperature of the condensate approaches the temperature of the steam and live or re-evaporated steam reaches chamber 17, the velocity of flow of fluid which may be steam or a mixture of steam and liquid over the seat 11 increases with a resultant reduction of pressure on the bottom of the valve. At the same time the combined hydrostatic pressure of condensate and incoming steam pressure in chamber 13 forces the valve closed so very little live steam escapes through the valve.

The valve remains closed until pressure in chamber 13 is again reduced, by condensation of any steam entrapped therein and by slow leakage through slot 25. It should be noted however that live steam in passages 20, 22 and 23 and chamber 19 tends to retard condensation in chamber 13 so the valve does not operate or cycle too frequently. As the chamber 19 and connected passages 20 and 23 fill with condensate which has less heat than steam, the condensation in chamber 13 is increased, lowering pressure, until the valve reopens and the cycle is repeated.

The heating chamber 19 controls the cycling of the valve by reducing valve opening as long as steam is present but the small port or slot 25 assures a periodic opening cycle. The heating chamber which surrounds a substantial portion of the valve chamber also neutralizes the effect of temperature surrounding the valve as a whole so that reduction in ambient temperature does not cause premature cycling of the valve.

We have illustrated and described our invention in a highly practical commercial embodiment. We have not attempted to illustrate or describe the various structural modifications or adaptations, as it is believed that this disclosure will enable those skilled in the art to embody or adapt our invention as may be desired for particular use conditions.

What is claimed as new is:

1. A steam trap, comprising:
a first body member having inlet and outlet ports therein adapted to be connected to inlet and outlet conduits respectively, said first body member having a second body member seat and having radially spaced inner and outer valve seat members disposed within and which project above the plane of said second body member seat, there being an annular outlet passage between said valve seat members opening to said outlet port and a centrally disposed valve controlled passage within the inner of said valve seat members, a second body member having a cavity therein, wall means dividing said cavity into a pair of adjacent chambers, one of said chambers defining a closed heating chamber and the other of said chambers opening externally of said second body member and defining a valve chamber, said second body member having a first body member seat surounding the valve chamber, means detachably connecting the two body members in such a manner that their seats mate and the valve chamber is closed by that portion of the first body member having the valve seat members, a first passage in the first body member connected to the inlet port and opening at the second body member seat, a second passage in the second body member connected to the heating chamber and opening at the first body member seat mating with said first passage, a third passage in the first body member connected to said centrally disposed passage and opening at the second body member seat, a fourth passage in the second body member connected to the heating chamber and opening at the first body member seat mating with the third passage, a gasket disposed between the first and second body member seats and having openings therein mating with said passages, and a disk-like valve disposed in said valve chamber for floating movement therein and in coacting relation to said valve seat members of said first body member.

2. A steam trap as defined in claim 1, wherein said valve has a groove on one side thereof, said groove opening at its outer end to said valve chamber and at its inner end to said outlet passage.

3. A steam trap as defined in claim 1, wherein said valve has an annular groove in its underside opening to said annular outlet passage between said valve seat members, and further has a groove-like passage on its underside extending outwardly from said annular groove and opening at its outer end to said valve chamber at the outer side of said outer valve seat member.

References Cited

UNITED STATES PATENTS

| | | | |
|---|---|---|---|
| 2,945,505 | 7/1960 | Hansen | 137—183 |
| 2,951,496 | 9/1960 | Yarnall | 137—183 |

ALAN COHAN, *Primary Examiner.*